US012325149B2

(12) United States Patent
Wang et al.

(10) Patent No.: US 12,325,149 B2
(45) Date of Patent: Jun. 10, 2025

(54) INTELLIGENT WASTE WOODEN FORMWORK RECOVERY AND RECYCLING SYSTEM AND METHOD

(71) Applicant: WUHAN CONSTRUCTION ENGINEERING GROUP CO., LTD., Wuhan (CN)

(72) Inventors: Shuai Wang, Wuhan (CN); Ming You, Wuhan (CN); Wenxiang Li, Wuhan (CN); Rong Gao, Wuhan (CN); Tong Lu, Wuhan (CN); Mingzhao Wang, Wuhan (CN); Bowen Long, Wuhan (CN); Yuanbang Ge, Wuhan (CN); Xin Li, Wuhan (CN); Hui Wang, Wuhan (CN); Chen Liu, Wuhan (CN); Bo Wang, Wuhan (CN); Min Yang, Wuhan (CN); Wen Wu, Wuhan (CN)

(73) Assignee: WUHAN CONSTRUCTION ENGINEERING GROUP CO., LTD., Wuhan (CN)

( * ) Notice: Subject to any disclaimer, the term of this patent is extended or adjusted under 35 U.S.C. 154(b) by 0 days.

(21) Appl. No.: 18/836,358

(22) PCT Filed: Dec. 29, 2022

(86) PCT No.: PCT/CN2022/143133
§ 371 (c)(1),
(2) Date: Aug. 7, 2024

(87) PCT Pub. No.: WO2023/185161
PCT Pub. Date: Oct. 5, 2023

(65) Prior Publication Data

US 2025/0144843 A1 May 8, 2025

(30) Foreign Application Priority Data

Mar. 28, 2022 (CN) ........................ 202210316574.4

(51) Int. Cl.
*B27N 3/18* (2006.01)
*B07B 1/28* (2006.01)
(Continued)

(52) U.S. Cl.
CPC .................. *B27N 3/18* (2013.01); *B07B 1/28* (2013.01); *B07B 1/42* (2013.01); *B07B 1/4663* (2013.01); *B07B 2201/04* (2013.01)

(58) Field of Classification Search
CPC .... B27N 3/18; B07B 1/28; B07B 1/42; B07B 1/4663; B07B 2201/04
(Continued)

(56) References Cited

U.S. PATENT DOCUMENTS 4,240,588 A * 12/1980 Fulghum, Jr. .......... B23Q 11/02 241/97

FOREIGN PATENT DOCUMENTS

| | | | | |
|---|---|---|---|---|
| CN | 212948297 U | * | 4/2021 | |
| CN | 113084961 A | * | 7/2021 | ............... B07B 1/28 |
| WO | WO-2023185161 A1 | * | 10/2023 | |

* cited by examiner

*Primary Examiner* — Terrell H Matthews

(57) ABSTRACT

An intelligent waste wooden formwork recovery and recycling system includes a screening part, a feeding part, and a processing part. The screening part includes a wood board unit, a wood strip unit and a wood block unit disposed inside a frame unit. The feeding part includes three conveying units inclined and disposed within an installation unit, and ends of the three conveying units are respectively aligned with the wood board unit, wood strip unit and wood block unit. The processing part includes a compaction unit, a moving unit, a discharging unit, a gauze unit, and a glue brushing unit sequentially disposed on a bracket unit. Wood materials are classified into three types and the three-layer conveying mechanism effectively controls an addition order of the wood material, significantly improving an utilization rate of
(Continued)

the wood materials and ensuring a uniform density distribution of the compacted wood materials.

10 Claims, 13 Drawing Sheets

(51) Int. Cl.
*B07B 1/42* (2006.01)
*B07B 1/46* (2006.01)
(58) Field of Classification Search
USPC .................................................... 209/365.1
See application file for complete search history.

INTELLIGENT WASTE WOODEN FORMWORK RECOVERY AND RECYCLING SYSTEM AND METHOD

TECHNICAL FIELD

The disclosure relates to the fields of construction engineering, and particularly to an intelligent waste wooden formwork recovery and recycling system, as well as an intelligent waste wooden formwork recovery and recycling method.

BACKGROUND

Wooden formwork is widely used in construction projects for pouring concrete beams, columns, plates, and other positions. During the construction process, due to construction needs, the whole wooden formwork is often cut into multiple strips of different specifications, resulting in a lot of waste wooden formwork of different sizes. The site is usually piled up with a large amount of waste wooden formwork, which not only occupies space but also causes environmental pollution if not properly disposed of. Currently, a common method to recycle and reuse the waste wooden formwork is to collect it on site, transport it out through transport vehicles, and then crush it into powder for use in incineration power generation or other purposes. However, this method is relatively crude. Although the waste wooden formwork cuts into different strips, it still possesses material toughness. If the waste wooden formwork could be reused like waste steel, it would reduce the consumption of wood resources for construction and has significant social and environmental benefits.

SUMMARY

In order to make up for the shortcomings in the related art, the purpose of the disclosure is to provide an intelligent waste wooden formwork recovery and recycling method, which can be directly applied to the recovery and recycling process of existing waste wooden formwork, making full use of wood materials with different sizes, effectively improving the utilization rate of the waste wooden formwork, and saving the loss of recycled resources.

Another purpose of the disclosure is to provide an intelligent waste wooden formwork recovery and recycling system, which classifies wood materials into three types by the three-stage wood screening, and then effectively controls the sequence of subsequent feeding through the subsequent the three-stage conveying mechanism, which not only avoids the blocking and overlap of the lower wood materials to the upper wood materials, but also enables small wood materials to fill gaps of large wood materials, thereby effectively improving the utilization rate of the wood materials, and making the density distribution of compacted wood materials uniform.

In order to further realize the above purposes, the disclosure adopts the following technical schemes: an intelligent waste wooden formwork recovery and recycling method includes the following steps S1 to S4.

S1, collected waste wooden formwork is poured into a wood board unit of a screening part, and a first vibration motor is started for vibration to make large-sized wood boards (i.e., large wood boards, large wood materials or wood boards) remain in the wood board unit, medium-sized wood strips (i.e., medium wood strips, medium wood materials or wood strips) fall into a wood strip unit, and small-sized wood blocks (i.e., small wood blocks, small wood materials, or wood blocks) fall into a wood block unit; after screening is completed and all wood materials (i.e., the wood boards, wood strips and wood blocks) are stable, the large-sized wood boards in the top wood board unit are gripped by a mechanical gripper into a one-way open transport plate of a top conveying unit, the medium-sized wood strips in the middle wood strip unit are slid out into a one-way open transport plate of a middle conveying unit through a bottom opening by controlling a switch mechanism to expose the bottom opening, and the small-sized wood blocks in the bottom wood block unit are slid out into a one-way open transport plate of a bottom conveying unit through a bottom opening by controlling a switch mechanism to expose the bottom opening, thereby completing the screening of the wood materials and transporting the wood materials from the screening part to a feeding part.

S2, a moving unit of a processing part is controlled to move below a glue brushing unit; a rotatable glue brush is moved inside a loading box by the driving of a fifth push rod motor; the rotatable glue brush is rotated to brush glue on an inside of the loading box by the driving of a second stepping motor; the glue brushing unit is raised after the glue is brushed; the moving unit is controlled to move below a gauze unit; an electric gripper is controlled to extend into the loading box by a fourth push rod motor and released to make gauze gripped by the electric gripper be laid into the loading box, and then the gauze unit is raised; and finally, the moving unit is controlled to move directly below a discharging unit, an opening of the loading box completely covers an opening of a hollow discharging body, thereby completing pre-feeding work.

S3, three first conveying motors (i.e., top conveying motor, middle conveying motor, and bottom conveying motor) of the feeding part are controlled separately; the large-sized wood boards are added to the discharging unit, followed by transporting the medium-sized wood strips to the discharging unit, and the wood materials (i.e., the large-sized wood boards and the medium-sized wood strips) enter the loading box through the discharging unit; a second vibration motor is started to vibrate the large-sized wood boards and the medium-sized wood strips inside the loading box thoroughly through second damping springs and rolling balls, and the wood strips fall into gaps between the wood boards and are glued to stop vibrating; the second vibration motor is turned off after the wood strips are fixed with the glue, the moving unit is moved to the glue brushing unit to brush glue, then returned to the discharging unit below, and the wood blocks in the wood block unit are poured into the discharging unit; the second vibration motor is turned on to make the wood blocks fill gaps between the wood boards and the wood strips, and the second vibration motor is turned off after stabilization of the wood materials; the moving unit is moved to the glue brushing unit to brush glue, then moved to the gauze unit below to add gauze; then the moving unit is moved to a compaction unit to compact the wood materials in the loading unit by making a press-fitted plate enter the loading box, thereby re-compacting and shaping wooden formwork.

S4, the moving unit is moved to a far right end, a second push rod motor is controlled to retract a moving baffle to expose an opening at a bottom (i.e., bottom opening)

of the loading box, and a size of the opening is slightly larger than the shaped wooden formwork; a first push rod motor is controlled to retract a second mounting frame to make the moving baffle no longer block a wooden formwork pushing-out channel; and a third push rod motor is controlled to push a moving push plate, and the shaped wooden formwork in the loading box is pushed by the moving push plate to slide out through the opening and enter an inclined transport plate of a transporting part through a rectangular opening of the vibration box, then the shaped wooden formwork is transported to a vicinity of a cutting part by controlling a second conveyer belt with a second conveying motor, and the shaped wooden formwork is gripped by the mechanical gripper into the cutting part to cut and reuse with a table saw.

From the above, the three-layer screening mechanism uses allocation and vibration to categorize complex wood materials of varying sizes into three types: large-sized wood boards, medium-sized wood strips, and small-sized wood blocks. These are then respectively stored in the wood board unit, the wood strip unit, and the wood block unit. Through the three-layer conveying mechanism, the sequence of adding wood materials of different sizes to the loading box is controlled, allowing the large wood materials to enter the loading box first, followed by medium wood materials filling the gaps left by the large wood materials, and finally, the small wood materials filling any remaining gaps. This, in coordination with the three-layer screening mechanism of the screening part, makes the best use of the wood materials with different sizes, effectively improving the utilization rate of waste wooden formwork. The processing part features a production line-style processing design, where the moving unit can move between the compaction unit, the discharging unit, the gauze unit, and the glue brushing unit, enabling step-by-step execution of discharging, gauze addition, glue brushing, and compaction processes. This structure, in conjunction with the three-layer conveying mechanism of the feeding part, allocates the entire process of wood board compaction and shaping into step-by-step operations, making the recycling process of the wooden formwork more standardized and ensuring that the shaped wooden formwork meets usage standards.

Accordingly, the disclosure further provides an intelligent waste wooden formwork recovery and recycling system, including: a platform part, the platform part is provided with a screening part, a feeding part, and a processing part thereon; the screening part includes: a frame unit, and a wood board unit, a wood strip unit, and a wood block unit which are arranged inside the frame unit from top to bottom in that order.

The feeding part includes: an installation unit and three conveying units, the three conveying units are respectively disposed at a top, a middle, and a bottom of the installation unit, and the three conveying units are inclined and arranged within the installation unit; and inclined downward ends of the three conveying units are respectively connected to the wood board unit, the wood strip unit, and the wood block unit, and the three conveying units are respectively configured to transport wood materials from the wood board unit, the wood strip unit, and the wood block unit.

The processing part includes: a bracket unit, and a compaction unit, a moving unit, an discharging unit, a gauze unit, and a glue brushing unit which are sequentially disposed on the bracket unit.

In an embodiment of the disclosure, the wood board unit includes: a wood board screening box as a main body, a top of the wood board screening box defines an opening, and a bottom of the wood board screening box defines multiple evenly spaced holes; a front and a back of the wood board screening box are respectively provided with two first longitudinal top struts, which are respectively connected to irregular shock absorbers on first transverse steel frames at a front and a back of the frame unit; a left and a right of the wood board screening box are respectively provided with two groups of a first transverse top strut and a first transverse bottom strut, which are respectively connected to irregular shock absorbers in middles of first and second longitudinal steel frames on a left and a right of the frame unit; and two first vibration motors are respectively disposed on middles on the left and the right of the wood board screening box.

In an embodiment of the disclosure, the wood strip unit includes: a wood strip screening box as a main body, a top of the wood strip screening box defines an opening that is slightly larger than that of the wood board screening box, and a bottom of the wood strip screening box defines multiple holes, which are slightly smaller than the holes defined in the bottom of the wood board screening box; a front and a back of the wood strip screening box are respectively provided with two groups of second longitudinal top struts, which are respectively connected to irregular shock absorbers in middles of second transverse steel frames at a front and a back of the frame unit; a left bottom and a right bottom of the wood strip screening box are respectively provided with second transverse bottom struts, which are respectively connected to irregular shock absorbers on insides of third longitudinal steel frames at a left and a right of the frame unit; first vibration motors are respectively disposed at lower middles of the left and the right of the wood strip screening box; the bottom of the wood board screening box is provided with a slope, and a bottom of the slope defines an opening, and a discharging baffle is disposed outside the opening.

In an embodiment of the disclosure, the wood block unit includes: a wood block conveying box as a main body, a top of the wood block conveying box defines an opening that is slightly larger than the wood strip screening box; a bottom of the wood block conveying box is provided with a slope, a bottom of the slope defines an opening, and a discharging baffle is disposed outside the opening.

In an embodiment of the disclosure, a side of the discharging baffle is provided with a rack track, and two sides of the rack track are provided with rack baffles, respectively; a first stepping motor is located on a side of the wood strip screening box, adjacent to the rack track; and the first stepping motor meshes with the rack track through a first gear.

In an embodiment of the disclosure, the compaction unit includes: a servo compressor as a main body, and a press-fitted plate disposed on a top of the servo compressor, a size of the press-fitted plate is the same as an opening of a loading box; and the press-fitted plate is configured to enter the loading box and compact wood materials inside.

The moving unit includes: a vibration box as a main body, the vibration box is installed on H-shaped steel beams through electric trolleys disposed below the vibration box; the vibration box is connected to the loading box inside through second damping springs; an outside of the loading box is provided with two second vibration motors, and a bottom of the loading box is provided with multiple rolling balls; a bottom of the loading box is provided with a first mounting frame; the first mounting frame is provided with two first push rod motors which are configured to make a second mounting frame installed on the first push rod motors to move up and down; the second mounting frame is provided two second push rod motors thereon, which are configured to control a moving baffle mounted on a screw rod to close and open the loading box.

In an embodiment of the disclosure, the discharging unit includes: a hollow discharging body as a main body, the hollow discharging body defines three oblique inlets, heights of the oblique inlets are respectively lower than the three conveying units of the feeding part; and a central channel of the hollow discharging body is smaller than a loading box.

The gauze unit includes: a push rod motor mounting plate, a fourth push rod motor, a fourth push rod, a gripper mounting plate, four electric grippers, and a gauze storage box which are arranged from top to bottom in that order; the fourth push rod motor is configured to move the gripper mounting plate up and down through the fourth push rod.

The glue brushing unit includes: a push rod motor mounting plate, a fifth push rod motor, a fifth push rod, a glue brush mounting plate, a second stepping motor, a rotatable glue brush, and a glass glue storage box which are arranged from top to bottom in that order; and the fifth push rod motor is configured to move the glue brush mounting plate up and down through the fifth push rod.

In an embodiment of the disclosure, the intelligent waste wooden formwork recovery and recycling system further includes: a transporting part disposed on the platform part; the transporting part includes: a second conveyer belt, a second conveying motor located on a side of the second conveyer belt, and an inclined transport plate located at an upper end of the second conveyer belt; and an inclined height of a side of the inclined transport plate is lower than a rectangular opening on a side of a vibration box.

In an embodiment of the disclosure, the intelligent waste wooden formwork recovery and recycling system further includes: a mechanical gripper part disposed on the platform part; the mechanical gripper part includes: a mechanical gripper, configured to grip wood boards and place the gripped wood boards onto the conveying unit disposed at the top of the installation unit, or to grip shaped wooden formwork and move the shaped wooden formwork to a cutting part for cutting.

From the above, the screening part separates the wooden formwork into different types of wood materials. These are then combined and processed through the transporting and feeding parts, achieving a process of separation followed by integration. Compared to the related art, this method is more energy-efficient and has a higher efficiency in synthesizing new wooden boards. The screening part corresponds to the processing part, the large wood boards, the medium wood strips, and the small wood blocks screened out by the screening part are then controlled in sequence through the subsequent three-layer conveying mechanism. That is, the large wood materials are added first, followed by adding the medium wood materials, and finally, the small wood materials are added. After each addition, vibration is applied, which can effectively fill gaps. This method makes the best use of wood materials of different sizes, effectively improving the utilization rate of waste wooden formwork, while also saving the loss of recycled resources.

Compared with the related art, the beneficial effects of the disclosure are as follows.

1. By setting up the three-layer screening part, the wood board screening box is used to screen the large-sized wood boards, the wood strip screening box is used to screen the medium-sized wood strips, and the wood block conveying box is used to store the small-sized wood blocks. This effectively screens a collection of miscellaneous wood materials, storing large intact wood boards in the first layer of the screening part, and the medium wood boards and strips enter the wood strip screening box through the holes at the bottom of the wood board screening box under the action of the vibration motor. Because the holes at the bottom of the wood strip screening box are smaller than those at the bottom of the wood board screening box, the medium wood boards and strips cannot pass through the holes at the bottom of the wood strip screening box, the small wood blocks and sawdust pass through the holes at the bottom of the wood strip screening box under the action of the vibration motor and enter the wood block conveying box below for storage. With the vibration motors and the irregular shock absorbers on the frame unit, all the wood board screening box, the wood strip screening box, and the wood block conveying box can vibrate effectively, allowing the internal wood materials to be screened. The three-layer wood screening method divides the wood materials into large, medium, and small types, and then through the subsequent three-layer conveying mechanism, it effectively controls the order of subsequent feeding, that is, first adding the large wood materials, then adding the medium wood materials, and finally adding the small wood materials. Each time after adding, the vibration is applied, allowing the wood materials in the loading box to be effectively filled into the loading box. Compared with the direct feeding and compacting method, this not only avoids the block and overlap of the lower wood materials on the upper wood materials but also allows the small wood materials to fill the gaps of the large wood materials, effectively improving the utilization rate of wood materials and making the density distribution of the compacted wood materials uniform.
2. By setting up three different screening boxes (i.e., wood board screening box, wood strip screening box, and wood block conveying box), the top layer of large wood boards are picked up by the mechanical gripper, and the middle layer of wood strips and the lower layer of wood blocks are quickly added to the conveying units of the feeding part through the slope design and the switch mechanism. By setting up three conveying unit channels, in conjunction with one receiving channel, that is, the discharging unit, the problem of the order of wood material addition during the wood board compacting process is effectively solved. By setting up the H-shaped steel supports (i.e., tracks) and installing the compaction unit, the discharging unit, the gauze unit, and the glue brushing unit on the tracks, the moving unit used for processing and shaping the wooden formwork can quickly move and switch between various processes, improving the efficiency of processing and shaping.
3. By setting up the vibration box and the loading box installed in the vibration box, the loading box can vibrate fully in the vibration box, effectively allowing large wood boards, medium wood strips, and small wood blocks to complement each other. For gaps that still exist after complementing, they can be effectively filled by brushing glue later. The density of the glue material used is the same as that of the wood material, so that after compaction, a standard formwork board can be formed, improving the utilization rate of waste wooden formwork and making the cost of forming a new wooden formwork lower. By setting up the first, second, and third push rod motors to work in coordination, the bottom of the loading box can be made closed and open at any time, and the shaped wooden formwork can be quickly pushed out from the bottom, which is more convenient and faster than the existing grabbing technology.

BRIEF DESCRIPTION OF DRAWINGS

The accompanying drawings described herein are provided to provide a further understanding of the disclosure and constitute a part of the disclosure. The illustrative embodiments of the disclosure and their descriptions are used to explain the disclosure and do not constitute undue limitations on the disclosure. In the attached drawings.

DESCRIPTION OF REFERENCE NUMERALS

0000—platform part:

0001—installation platform; 0002—H-shaped steel support;

1000—screening part:

1100—frame unit;

1101—vertical steel frame; 1102*a*—side iron sheet; 1102*b*—bottom iron sheet; 1103—base; 1104—longitudinal steel frame; 1105—transverse steel frame; 1106—irregular shock absorber; 1106*a*—mounting frame; 106*b*—first damping spring; 1106*c*—damping bearing;

1200—wood board unit;

1201—wood board screening box; 1202*a*—first transverse top strut; 1202*b*—first longitudinal top strut; 1202*c*—first transverse bottom strut; 1203—first vibration motor;

1300—wood strip unit;

1301—wood strip screening box; 1302*a*—second longitudinal top strut; 1302*b*—second transverse bottom strut; 1303—discharging baffle; 1304—baffle track; 1305—switch mechanism; 1305*a*—first stepping motor; 1305*b*—first gear; 1305*c*—rack track; 1305*d*—rack baffle;

1400—wood block unit;

1401—wood block conveying box; 1402*a*—third longitudinal top strut; 1402*b*—vertical bottom strut;

2000—feeding part:

2100—installation unit;

2102—first vertical mounting bracket; 2103—longitudinal mounting rod; 2104—first transverse mounting bracket;

2200—conveying unit;

2201—first conveyer belt; 2202—first conveying motor; 2203—one-way open transport plate;

3000—processing part:

3100—bracket unit;

3101—second vertical mounting bracket; 3102—H-shaped steel beam; 3103—second transverse mounting bracket; 3104—mounting top plate; 3105—push rod motor mounting plate;

3200—compaction unit;

3201—servo compressor; 3202—press-fitted plate;

3300—moving unit;

3301—electric trolley; 3302—vibration box; 3302*a*—rectangular opening; 3303—second damping spring; 3304—second vibration motor; 3310—loading box; 3311—rolling ball; 3312—first mounting frame; 3313—first push rod motor; 3314—second mounting frame; 3315—second push rod motor; 3316—moving baffle; 3317—third push rod motor; 3318—moving push plate;

3400—discharging unit;

3401—hollow discharging body; 3402—oblique inlet;

3500—gauze unit;

3501—fourth push rod motor; 3502—fourth push rod; 3503—gripper mounting plate; 3504—electric gripper; 3505—gauze storage box;

3600—glue brushing unit;

3601—fifth push rod motor; 3602—fifth push rod; 3603—glue brush mounting plate; 3604—second stepping motor; 3605—rotatable glue brush; 3606—glass glue storage box;

4000—transporting part:

4001—inclined transport plate; 4002—second conveyer belt; 4003—second conveying motor;

5000—mechanical gripper part:

5001—mechanical gripper;

6000—cutting part.

DETAILED DESCRIPTION OF EMBODIMENTS

In order to facilitate the understanding and implementation of the disclosure by those skilled in the art, the disclosure will be further described in detail with the attached drawings and embodiments. It should be understood that the embodiments described here are only used to illustrate and explain the disclosure, and are not used to limit the disclosure.

Figure 1:
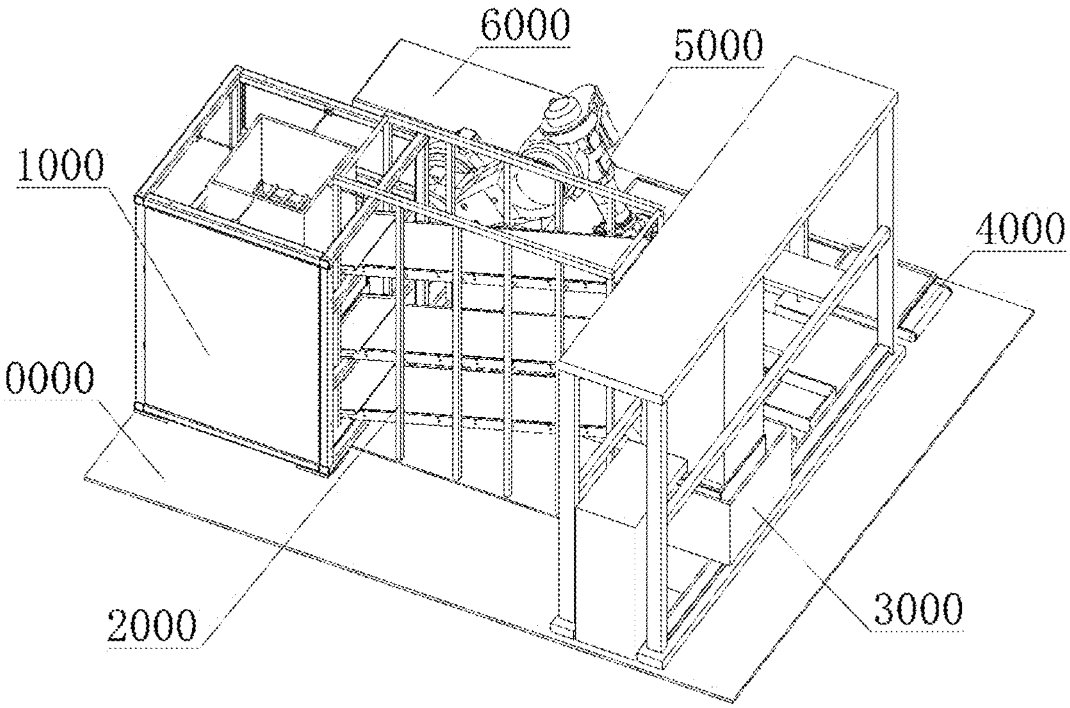
FIG. 1 illustrates a schematic diagram of a whole structure.
Figure 2:
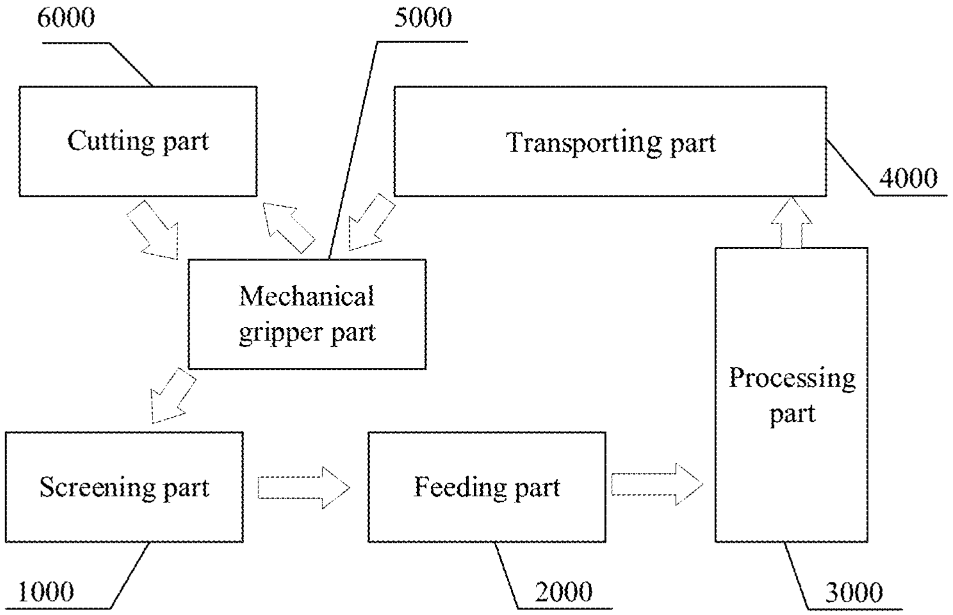
FIG. 2 illustrates a logical block diagram of various parts disposed on a platform part.

An intelligent waste wooden formwork recovery and recycling system, as shown in FIG. 1 and FIG. 2, includes: a platform part 0000 disposed at a bottom of the system, a screening part 1000, a feeding part 2000, a processing part 3000, a transporting part 4000, a mechanical gripper part 5000 and a cutting part 6000 installed on the platform part 0000, and the most critical parts are the screening part 1000, the feeding part 2000 and the processing part 3000. The screening part 1000 has three screening mechanisms with upper, middle, and lower layers. These mechanisms use vibration and allocation to separate the mixed wood materials with complex sizes into three types: large wood boards, medium wood strips, and small wood blocks, which are stored in a wood board unit 1200, a wood strip unit 1300, and a wood block unit 1400, respectively. At the same time, the wood boards in the wood board unit 1200 can be picked up by the mechanical gripper part 5000 and placed into a top of the feeding part 2000, while the wood strip unit 1300 and the wood block unit 1400 have slopes at their bottoms, allowing the wood materials to be slid out into a middle and a bottom of the feeding part 2000 through switch mechanisms 1305. This design effectively classifies the existing wood materials, preparing them for further processing. The feeding part 2000 controls the order of adding wood materials with different sizes into a loading box 3310 successively through the three-layer conveying mechanism, ensuring that the large wood materials are added first, followed by adding the medium wood materials to fill the gaps among the large wood materials, and finally the small wood materials are added to fill the remaining gaps. This design, combined with the three-layer screening mechanism of the screening part 1000, maximizes the utilization of used wooden formwork and reduces resource consumption. The processing part 3000 features a production line-style processing design. The moving unit 3300 can move between a compaction unit 3200, a discharging unit 3400, a gauze unit 3500, and a glue brushing unit 3600, for performing operations such as discharging, adding gauze, brushing glue, and compaction. This structure, along with the three-layer conveying mechanism of the feeding part 2000, follows the sequence of gluing, adding gauze, adding large wood materials, vibration, adding medium wood materials, vibration, adding small wood materials, vibration, gluing, adding gauze, compacting, and removing. This structure assigns the entire wooden formwork compaction and shaping process in a step-by-step manner, making the wooden formwork recycling process more standardized and ensuring that the shaped wooden formwork meets the usage standards. The moving unit 3300 of the processing part 3000 includes the loading box 3310. The loading box 3310, connected to the second damping springs 3303 through the rolling balls 3311, allows the vibration box 3302 to vibrate effectively within the moving unit 3300, promoting the filling of gaps among the wood materials. The bottom of the loading box 3310 is equipped with a wood board ejection mechanism. By controlling the second push rod motor 3315 to retract the moving baffle 3316, an opening is exposed at the right bottom of the loading box 3310, which is slightly larger than the shaped wooden formwork. The purpose of this opening is to allow the wooden formwork to be smoothly pushed out. Then, by controlling the first push rod motor 3313 to retract the second mounting frame 3314, the moving baffle 3316 no longer blocks the pushing-out channel of the wooden formwork. At this point, by controlling the third push rod motor 3317 to push the moving push plate 3318, the moving push plate 3318 further pushes the shaped wooden formwork inside the loading box out through the opening, and after sliding out, it enters the inclined transport plate 4001 of the transporting part 4000 through the rectangular opening 3302*a* of the vibration box 3302. The purpose of this structure is to push out the compacted wooden formwork when it is located at the bottom of the loading box, allowing it to enter the transporting part 4000. The loading box 3310 is then emptied to proceed to the next working cycle. Compared with the related art that grabs the wooden formwork from the top, the technical advantage of this structure is that it does not need to lift the wooden formwork. By using the controllable opening structure at the bottom and pushing the wooden formwork out with the push rods, it effectively improves the efficiency of taking out the wooden formwork and saves space and energy without the need for a wooden formwork lifting mechanism.

Figure 3:
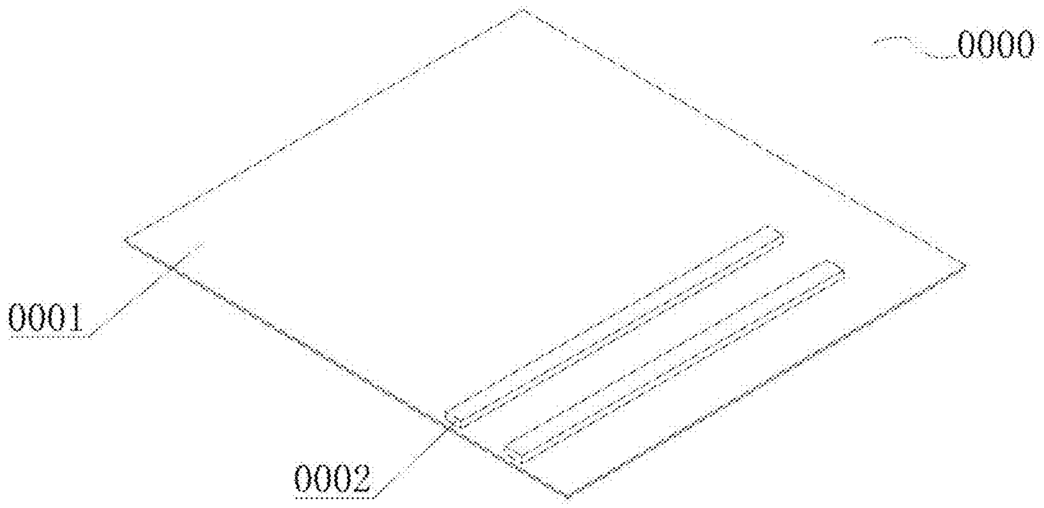
FIG. 3 illustrates a schematic structural diagram of the platform part.
Figure 4:
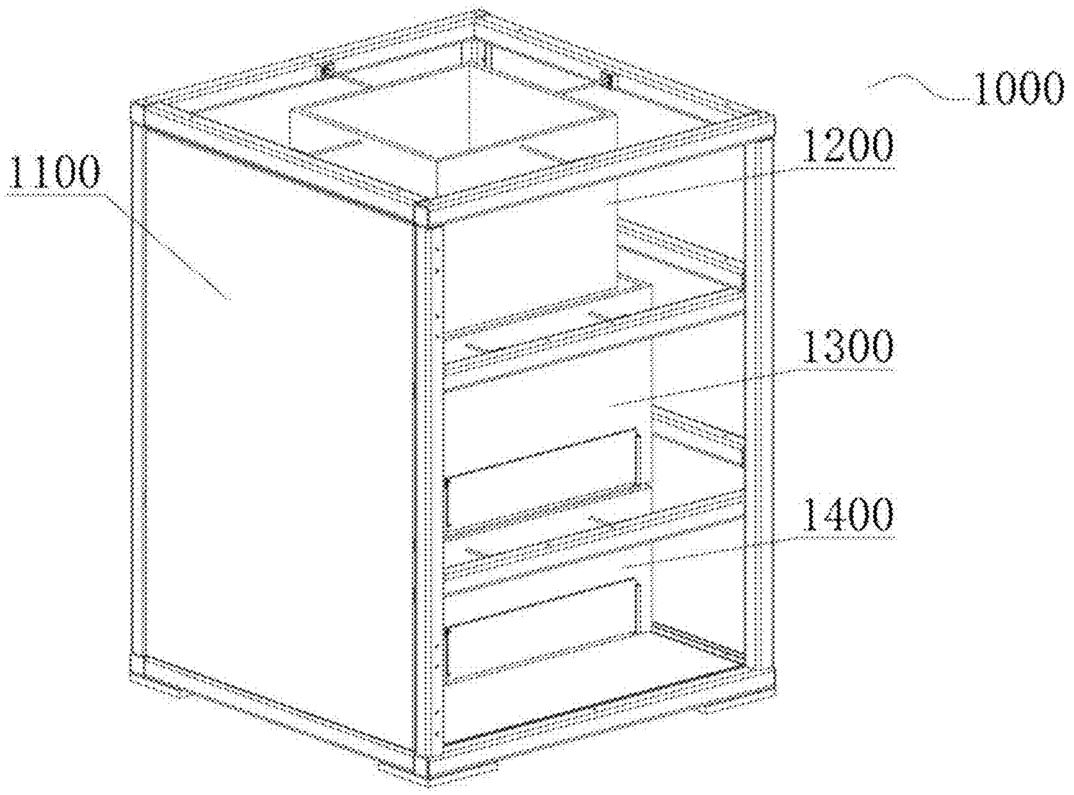
FIG. 4 illustrates a schematic structural diagram of a screening part.
Figure 5:
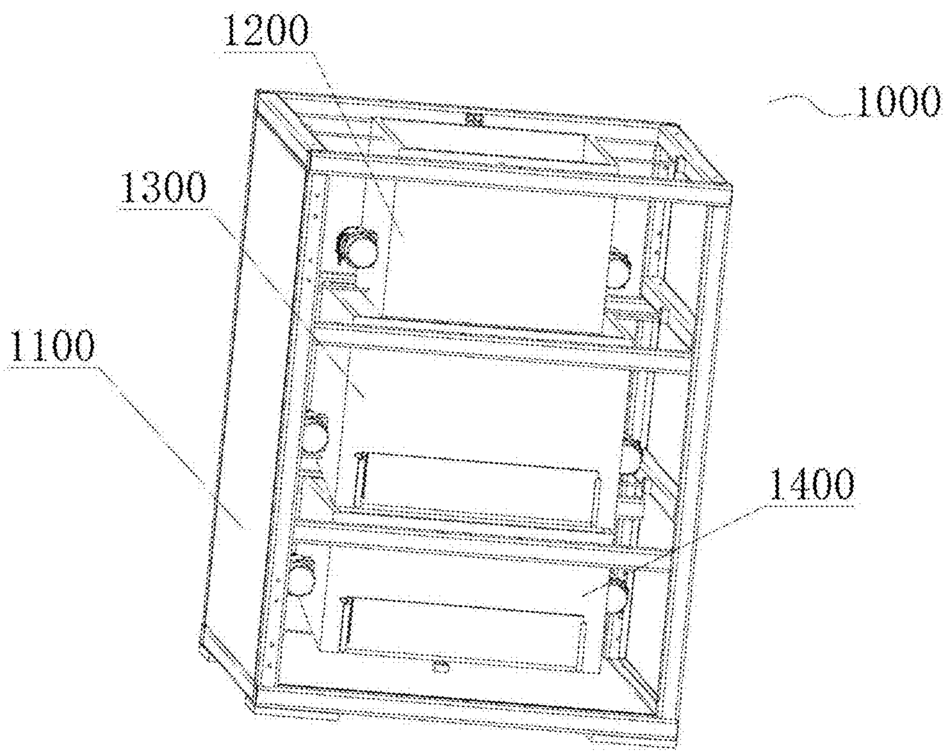
FIG. 5 illustrates a schematic structural diagram of the screening part.

As shown in FIG. 3, the platform part 0000 includes a mounting platform 0001 at the bottom and H-shaped steel supports 0002 arranged on a right side of the mounting platform 0001. As shown in FIGS. 4 and 5, the screening part 1000 includes: a frame unit 1100, and the wood board unit 1200, the wood strip unit 1300 and the wood block unit 1400 which are installed inside the frame unit 1100 from top to bottom in that order.

Figure 6:
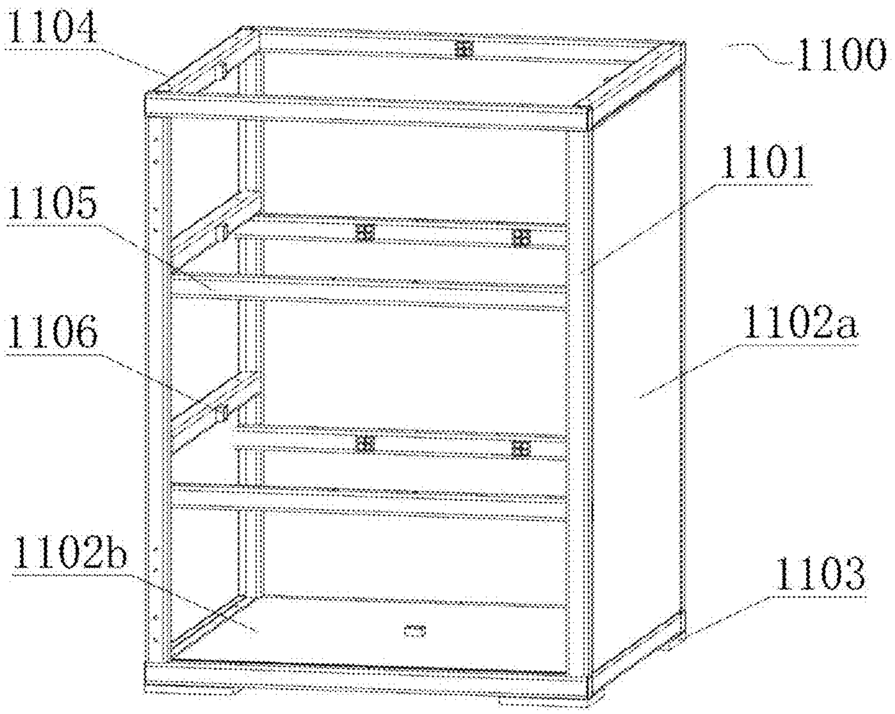
FIG. 6 illustrates a schematic structural diagram of a frame unit of the screening part.

As shown in FIG. 6, the frame unit 1100 includes eight transverse steel frames 1105 at front and back, eight longitudinal steel frames 1104 at left and right and four vertical steel frames 1101 at front and back, which together form a main frame. Four bases 1103 are installed at four corners of a bottom of the main frame, the bottom of the main frame is covered with a bottom iron sheet 1102*b*, and the left and the right of the main frame are covered with side iron sheets 1102*a*, respectively. The irregular shock absorbers 1106 are respectively installed inside the transverse steel frames 1105 at the front and back of the top of the main frame, two irregular shock absorbers 1106 are installed inside each of the second and third transverse steel frames 1105 at the front and back of the main frame, the irregular shock absorber 1106 is installed on the middle of the inner side of each of the three longitudinal steel frames 1104 from top to bottom at the left and the right of the main frame, and the irregular shock absorber 1106 is installed on the middle of the bottom iron sheet 1102*b*.

Figure 12:
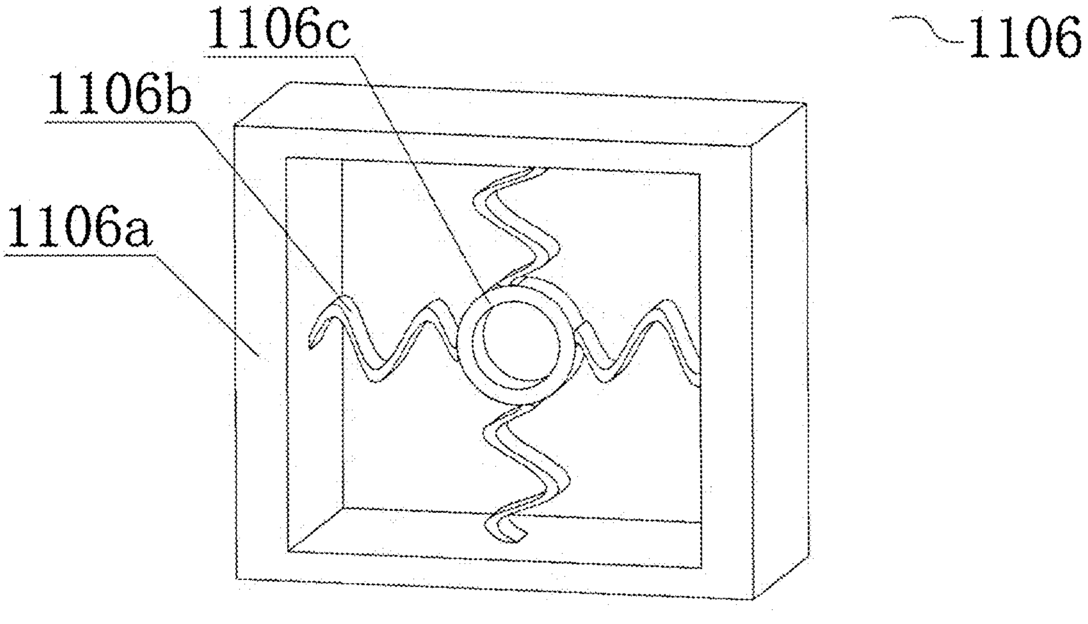
FIG. 12 illustrates a schematic structural diagram of an irregular shock absorber of the frame unit of the screening part.

As shown in FIG. 12, the irregular shock absorber 1106 includes a mounting frame 1106*a* as a shell, with four first damping springs 1106*b* connected to the damping bearing 1106*c* in the middle in all four directions. The purpose of this structure is that the damping bearing 1106*c* of the irregular shock absorber 1106 on each steel frame is connected and fixed with the strut on the screening box, ensuring that the screening box does not exceed the vibration range when vibrating, and preventing the wood materials from falling out of the wood board area, thus ensuring the stability during vibration screening.

Figure 7:
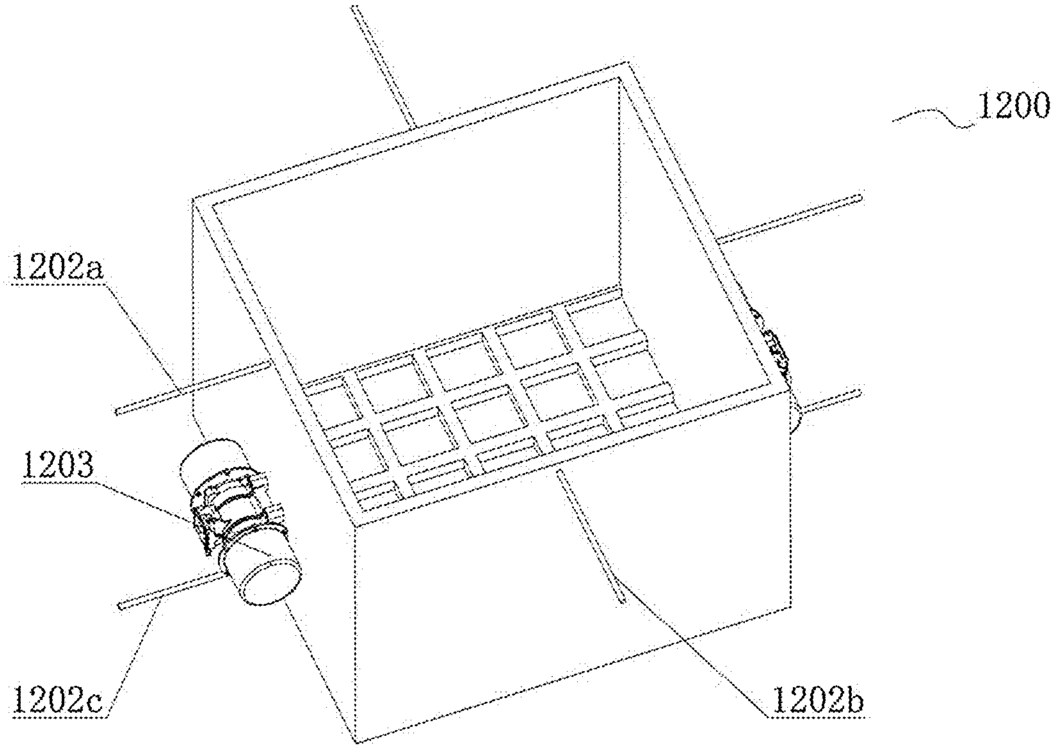
FIG. 7 illustrates a top view of a wood board unit of the screening part.
Figure 8:
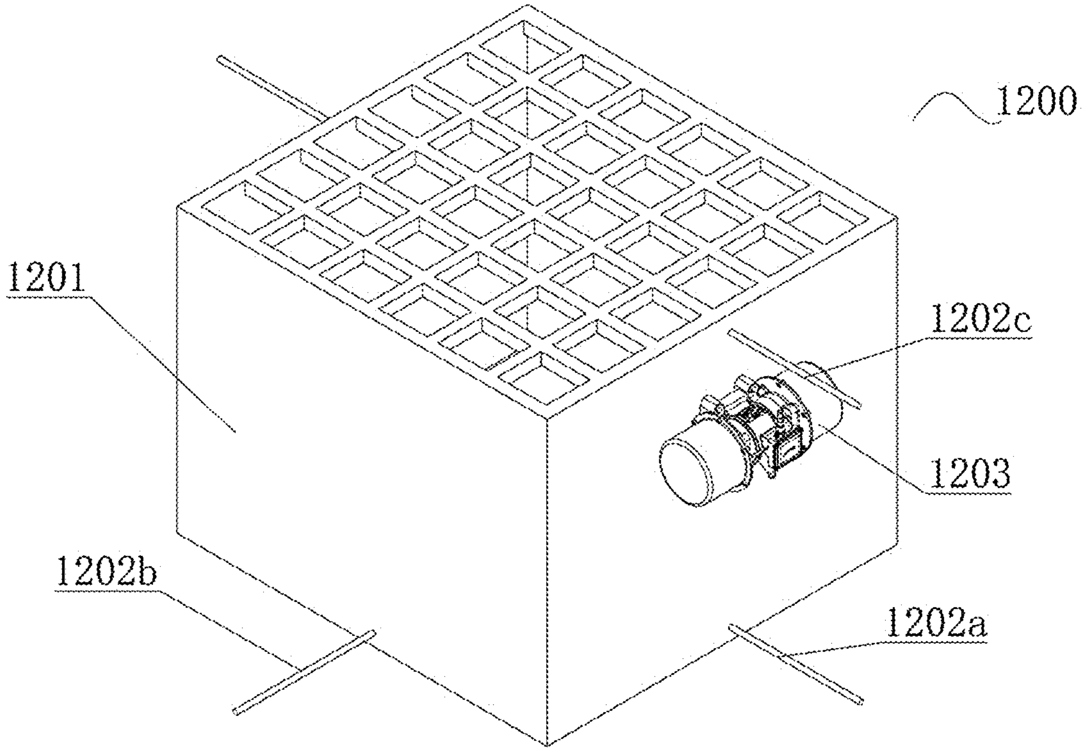
FIG. 8 illustrates a bottom view of the wood board unit of the screen part.

As shown in FIGS. 7 and 8, the wood board unit 1200 includes a wood board screening box 1201 as a main body. The top of the wood board screening box 1201 defines an opening, and the bottom of the wood board screening box 1201 defines multiple evenly spaced holes, which are larger than the size of the wood strips. Each hole is a rectangular hole, and large wood boards cannot pass through the holes, but the wood strips with smaller width can pass through the holes. The wood board is a wood with a large length and width, and the wood strip is a wood with a short length or width, they can screened through the top of the screening part but not the middle of the screening part. The wood block is a wood with a short length and width, which can be screened through the top and the middle of the screening part. The purpose of this structure is to make the larger wood boards stay in the wood board screening box 1201, and the smaller wood strips and blocks are all screened and dropped into the wood strip unit 1300. Two first longitudinal top struts 1202*b* are respectively disposed at the front and the back of the wood board screening box 1201, and the two first longitudinal top struts 1202*b* are respectively fixedly connected with the irregular shock absorbers 1106 on the first transverse steel frames 1105 at the front and the back of the frame unit 1100. The left and the right of the wood board screening box 1201 are respectively provided with two groups of first transverse top strut 1202*a* and first transverse bottom strut 1202*c*, and the two groups of first transverse top strut 1202*a* and first transverse bottom strut 1202*c* are respectively fixedly connected with the irregular shock absorbers 1106 in the middles of the first and second longitudinal steel frames 1104 at the left and the right of the frame unit 1100. Two first vibration motors 1203 are disposed on the middles of the left and the right of the wood board screening box 1201. The first vibration motor 1203 is a universal part, and its function is to drive the screening box to vibrate, so that the wood boards loaded in the screening box can vibrate.

Figure 9:
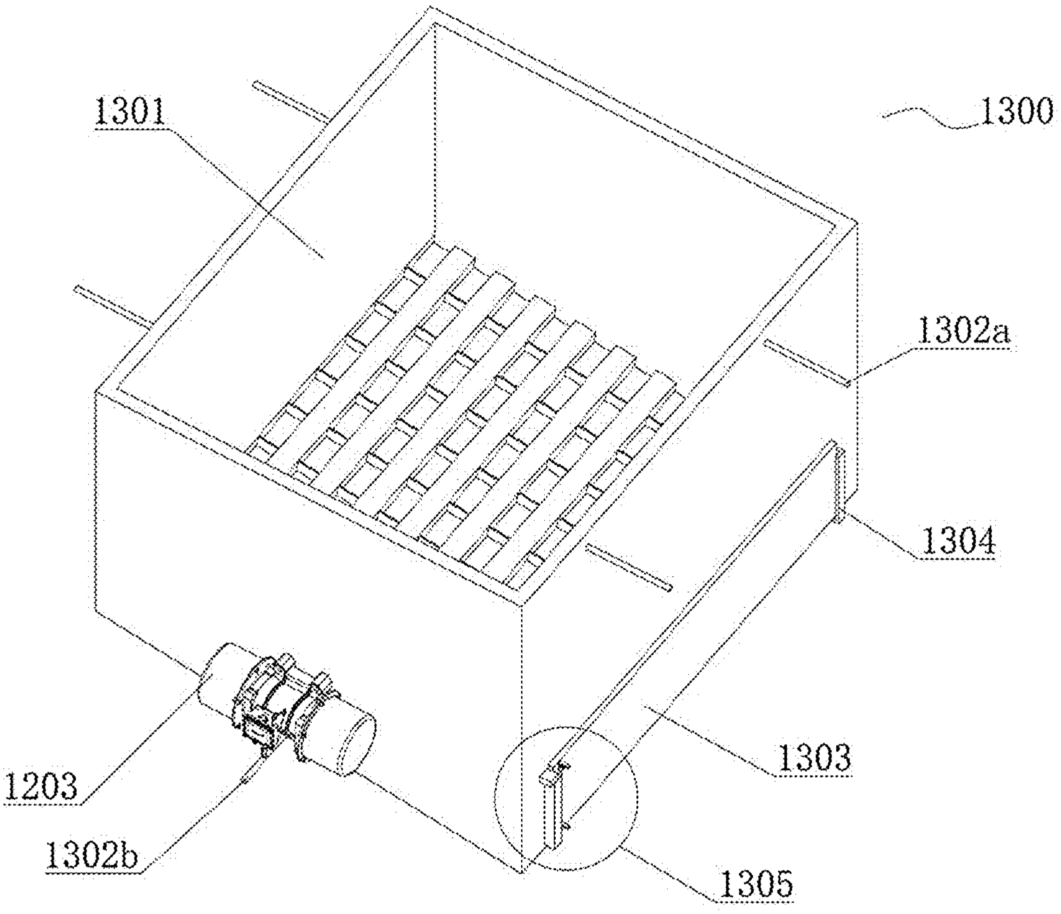
FIG. 9 illustrates a top view of a wood strip unit of the screening part.
Figure 10:
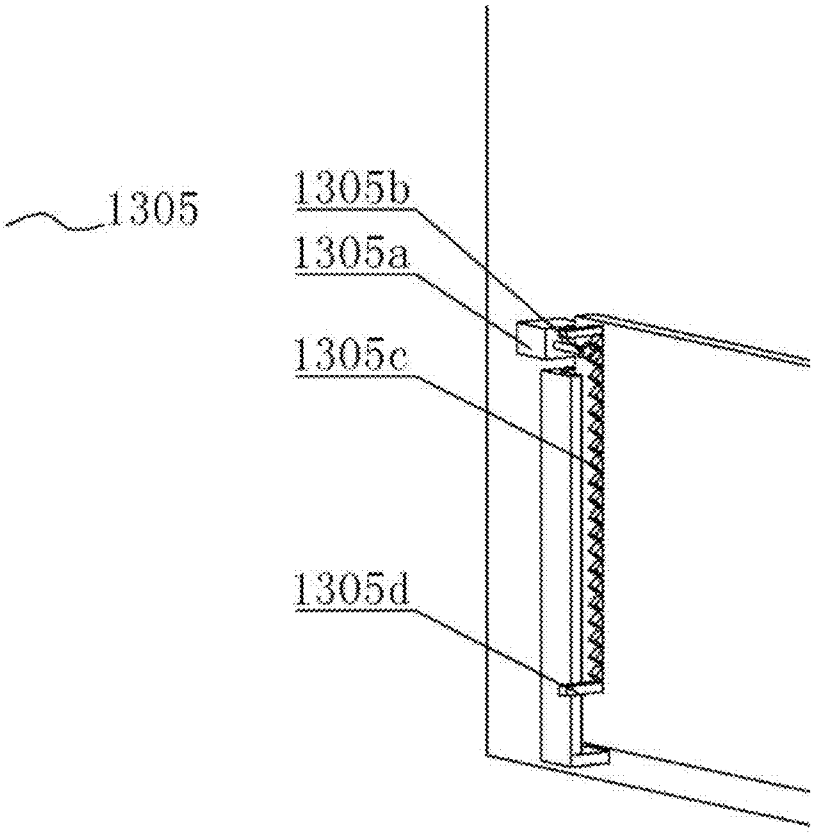
FIG. 10 illustrates an enlarged view of a switch mechanism of the wood strip unit of the screening part.

As shown in FIGS. 9 and 10, the wood strip unit 1300 includes a wood strip screening box 1301 as a main body. The wood strip screening box 1301 is slightly larger than the wood board screening box 1201. The purpose of this structure is that when the wood board screening box 1201 performs vibration screening, it will shift left and right, which can make up for the error caused by the shift, so that the falling range of the wood board screening box 1201 is always within the opening range of the wood strip screening box 1301. The bottom of the wood strip screening box 1301 also defines multiple holes, but the holes are smaller, which allows the wood blocks with smaller length and width to pass through, but the wood strips with longer length cannot pass through. The function of this structure is to keep the longer wood strips in the wood strip screening box 1301, and the smaller wood blocks are screened through the holes and fall into the wood block conveying box 1401. The bottom of the wood strip screening box 1301 is provided with a slope, and an opening is defined at the bottom of the slope, and a discharging baffle 1303 is arranged outside the opening. The left side of the discharging baffle 1303 is provided with a rack track 1305*c*, two sides of the rack track 1305*c* are respectively provided with rack baffles 1305*d*, a first stepping motor 1305*a* is provided on the side of the wood strip screening box 1301 and on the left side of the discharging baffle 1303, and the first stepping motor 1305*a* meshes with the rack track 1305*c* through the first gear 1305*b*. The first stepping motor 1305*a* is a universal part, and its function is to provide power. The function of this structure is to control the operation of the first stepping motor 1305*a*, and then the first gear 1305*b* moves on the rack track 1305*c*, so that the discharging baffle 1303 moves up and down, and the purpose of discharging from the bottom opening of the wood strip screening box 1301 is achieved. The two groups of second longitudinal top struts 1302*a* are respectively disposed at the front and the back of the wood strip screening box 1301, and the two groups of second longitudinal top struts 1302*a* are fixedly connected to the irregular shock absorbers 1106 on the second transverse steel frames 1105 at the front and back of the frame unit 1100. The wood strip screening box 1301 is provided with second transverse bottom struts 1302*b* at its left bottom and right bottom, which are fixedly connected to the irregular shock absorbers 1106 on the inside of the third longitudinal steel frames 1104 of the left and right of the frame unit 1100. The wood strip screening box 1301 is provided with first vibration motors 1203 at its lower middle parts of its left and its right. The function of this structure is to make the wood materials vibrate in the wood strip screening box 1301 through the first vibration motors 1203, so that smaller wood blocks can fall down. At the same time, by opening the discharging baffle 1303 and setting the inclination angle, the wood materials in the wood strip screening box 1301 can be ensured to fall smoothly into the one-way open transport plate 2203 of the conveying unit 2200, and the stability in the vibration process is ensured through the connection of the struts and the irregular shock absorbers.

Figure 11:
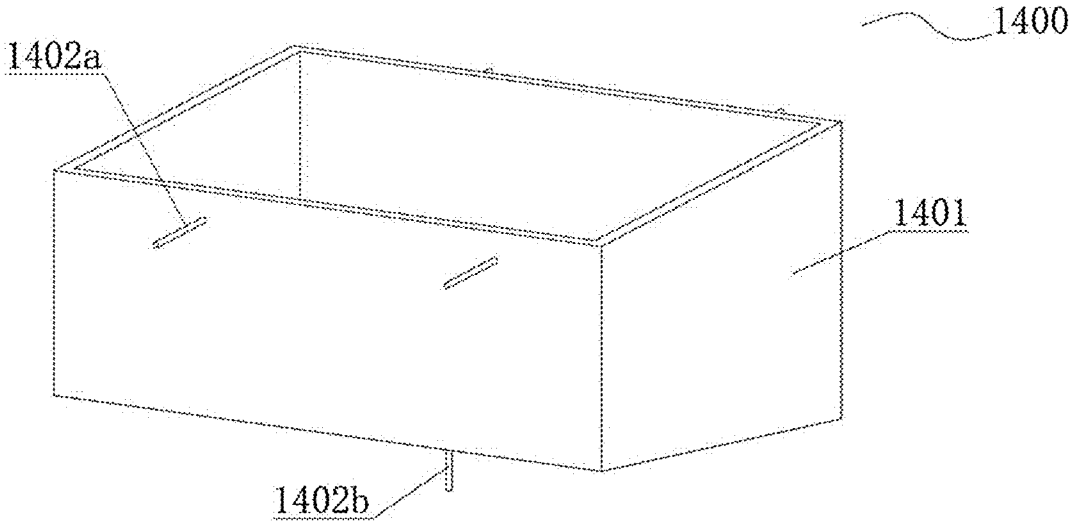
FIG. 11 illustrates a rear view of a wood block unit of the screening part.

As shown in FIG. 11, the wood block unit 1400 includes the wood block conveying box 1401 as a main body. The opening at the top of the wood block conveying box 1401 is slightly larger than that of the wood strip screening box 1301, and the bottom of the wood block conveying box 1401 is also provided with a slope, with a discharging baffle 1303, a baffle track 1304, and a switch mechanism 1305 on the right side of the wood block conveying box 1401, which operates on the same principle as mentioned above.

The two groups of third longitudinal top struts 1402*a* are disposed at the front and the back of the wood block conveying box 1401, which are respectively connected with the irregular shock absorbers 1106 of the third transverse steel frames 1105 at the front and the back of the frame unit 1100, the vertical bottom strut 1402*b* is disposed at the middle of the bottom of the wood block conveying box 1401, which is fixedly connected with the irregular shock absorber 1106 on the middle of the bottom iron sheet 1102*b* of the frame unit 1100 to provide gravity support for the wood block conveying box 1401. At the same time, the bottom of the wood block conveying box 1401 is sealed without holes. The function of this structure is that the wood block conveying box 1401 is used as the smallest wood storage and transport box to collect all the fallen wood materials above, and then transport them to the one-way open transport plate 2203 of the conveying unit 2200 through the slope and opening.

Figure 13:
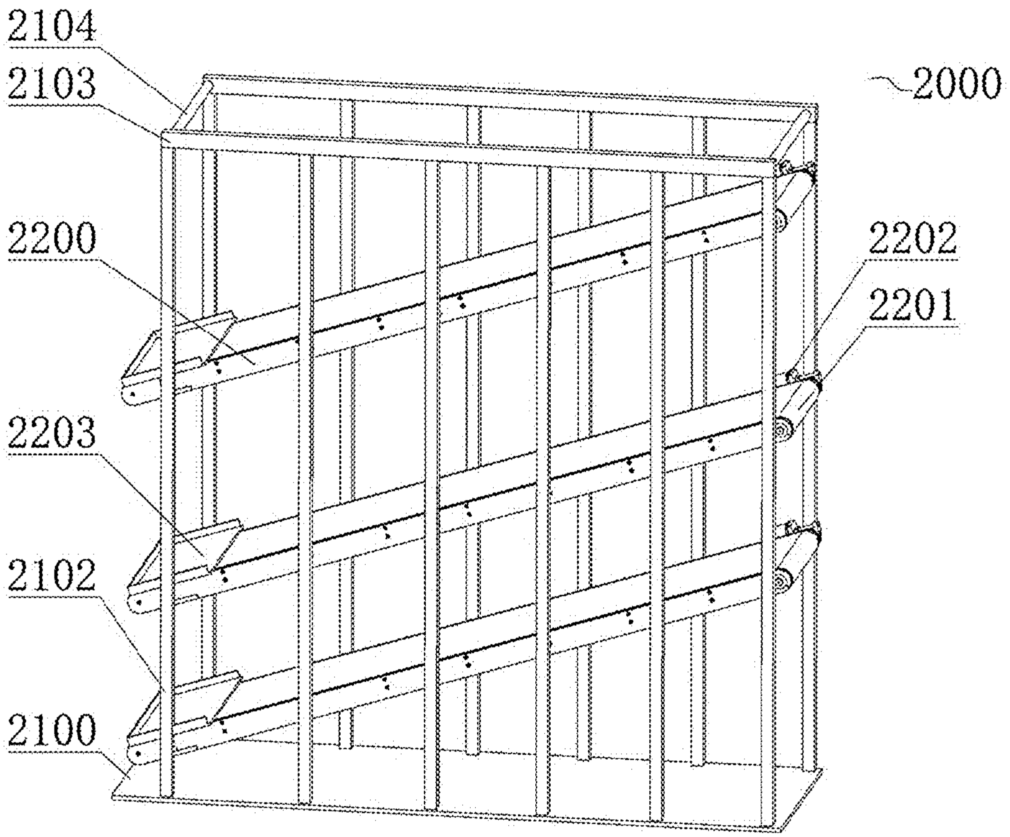
FIG. 13 illustrates a schematic structural diagram of a feeding part.
Figure 14:
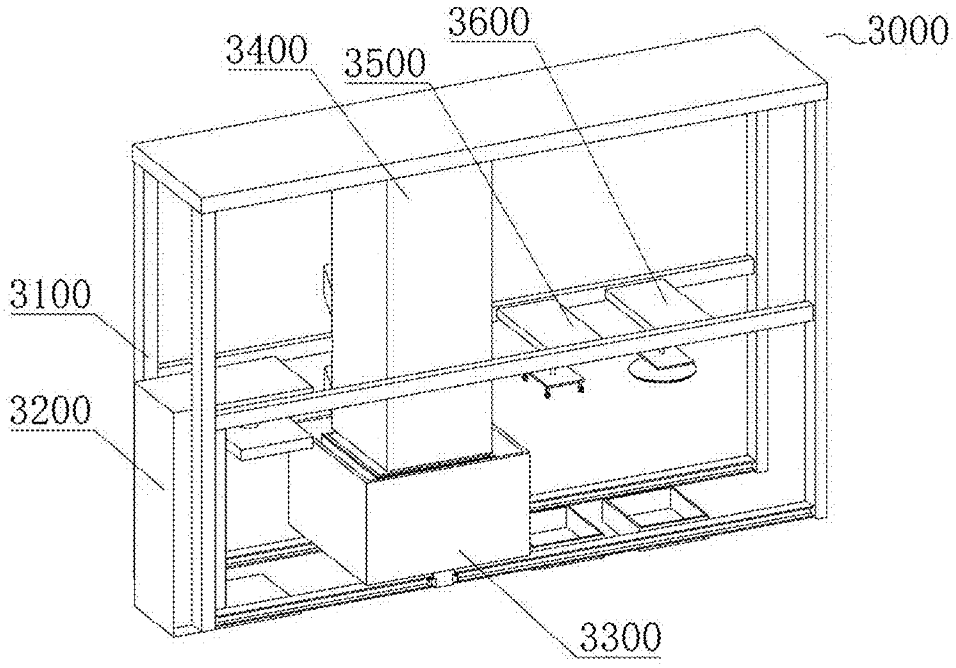
FIG. 14 illustrates a schematic structural diagram of a processing part.
Figure 15:
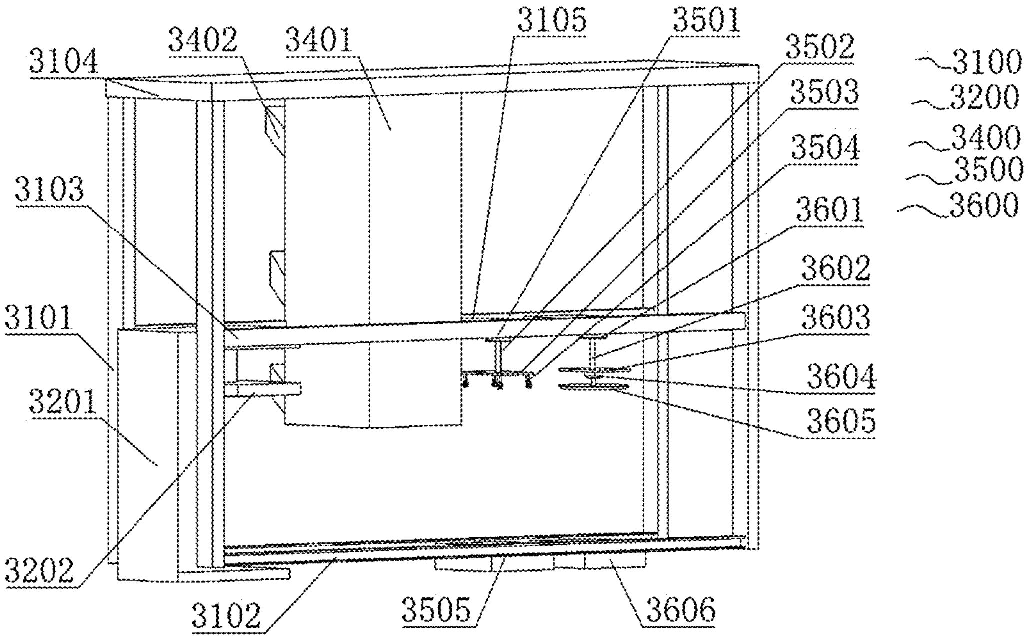
FIG. 15 illustrates a schematic structural diagram of each unit of the processing part.
Figure 16:
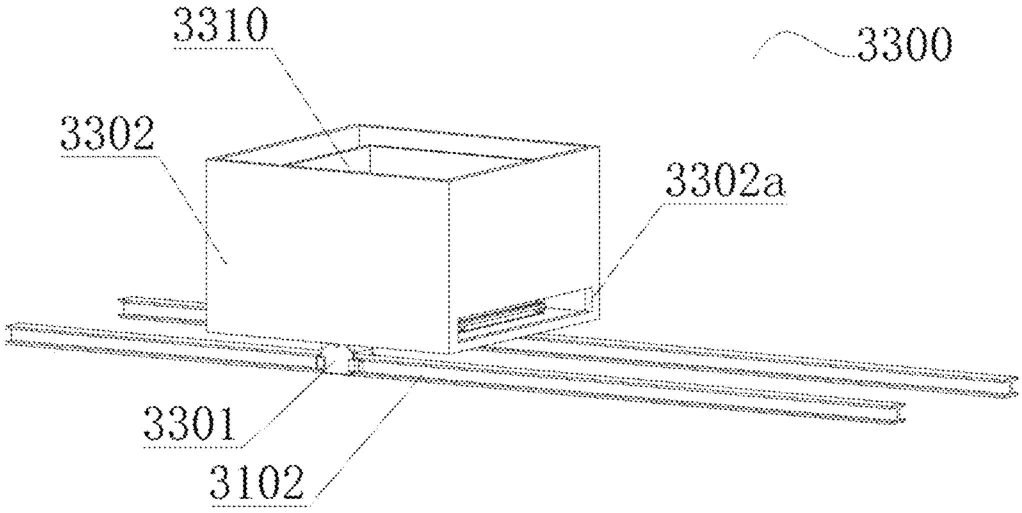
FIG. 16 illustrates a schematic structural diagram of a moving unit of the processing part.
Figure 17:
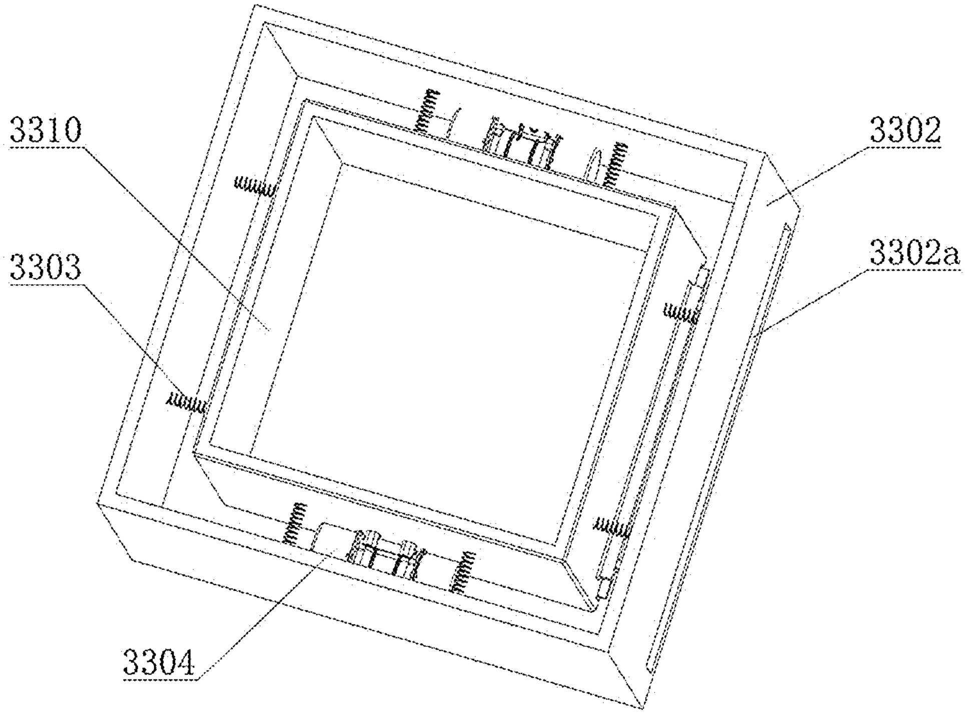
FIG. 17 illustrates a top view of a vibration box of the moving unit of the processing part.
Figure 18:
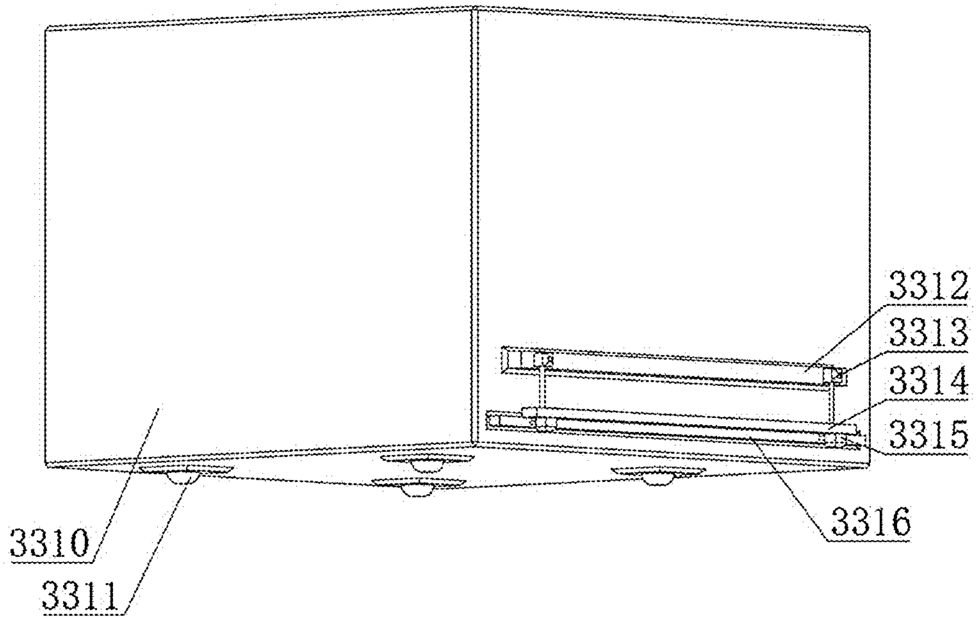
FIG. 18 illustrates a side view of the vibration box of the moving unit of the processing part.
Figure 19:
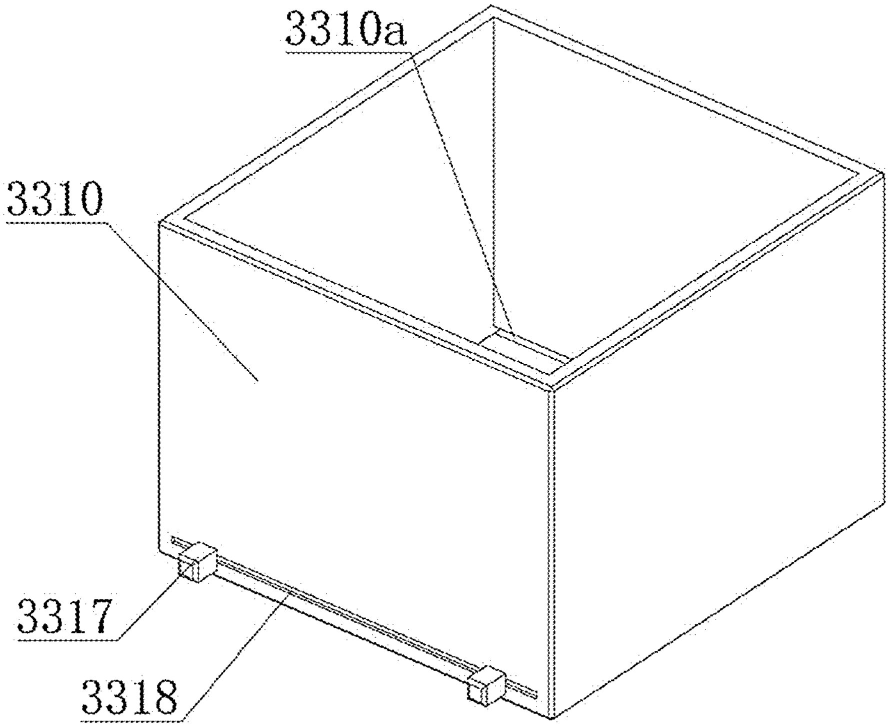
FIG. 19 illustrates a rear view of the vibration box of the moving unit of the processing part.

As shown in FIG. 13, the feeding part 2000 includes an installation unit 2100 as a main body, and the conveying units 2200 are installed on the installation unit 2100. The installation unit 2100 includes four first vertical mounting brackets 2102 as a main body, the tops of which are connected by first horizontal mounting brackets 2104 and longitudinal mounting rods 2103. Three conveying units 2200 are installed in the middle of the installation unit 2100 through the longitudinal mounting rods 2103, and these conveying units 2200 are divided into top, middle, and bottom sections, all of which are inclined and equipped with one-way open transport plates 2203. The purpose of this structure is that the top, middle, and bottom conveying units 2200 are respectively used for transporting wood materials from the wood board unit 1200, the wood strip unit 1300, and the wood block unit 1400. The top conveying unit 2200 is where the mechanical claw part 5000 picks up large targets from the wood board unit 1200 and places them onto the one-way open transport plate 2203. The middle conveying unit 2200 is positioned with its left bottom side close to the lower side of the discharging baffle 1303 of the wood strip unit 1300. When the discharging baffle 1303 is opened, due to the slope at the bottom of the wood strip screening box 1301, the wood strips slide into the one-way open transport plate 2203. The bottom conveying unit 2200 is used for transporting wood materials from the wood block unit 1400, operating on the same principle as the wood strip unit 1300. The upper right side of each conveying unit 2200 is close to the corresponding oblique inlet 3402 of the discharging unit 3400. When the first conveying motor 2202 is controlled to move the first conveyer belt 2201, causing the one-way open transport plate 2203 to move to the right end, the wood materials are poured precisely into the oblique inlet 3402 due to the right-side opening of the one-way open transport plate 2203, and then enter the hollow discharging body 3401.

As shown in FIGS. 13 to 19, the processing part 3000 includes a bracket unit 3100 as a main body. A compaction unit 3200, a moving unit 3300, a discharging unit 3400, a gauze unit 3500 and a glue brushing unit 3600 are sequentially installed on the bracket unit 3100 from left to right in that order.

The bracket unit 3100 includes four second vertical mounting brackets 3101, with a mounting top plate 3104 at the top, two second transverse mounting brackets 3103 at the left and the right in the middle, and the H-shaped steel beams 3102 at the left and right in the bottom. The H-shaped steel beam 3102 is installed on the H-shaped steel support 0002. Two same push rod motor mounting plates 3105 are installed on right sides of middles of the two second transverse mounting brackets 3103 for mounting the gauze unit 3500 and the glue brushing unit 3600.

The compaction unit 3200 is located at the leftmost side, and its main body is composed of a servo compressor 3201. The servo compressor 3201 is a universal part, its function is to provide power. The press-fitted plate 3202 on the servo compressor 3201 has the same size as the opening of the loading box, and can just enter the loading box and compact the wood materials in the loading box.

The moving unit 3300 includes the vibration box 3302 as the main body. The vibration box 3302 is installed above the H-shaped steel beams 3102 through the electric trolleys 3301 below. The electric trolley 3301 is a universal part, which allows the vibration box 3302 to move and fix on the track composed of the H-shaped steel beams 3102. The right bottom of the vibration box 3302 defines a rectangular opening 3302*a*, and the purpose of this structure is to provide a channel for outputting the shaped wooden formwork. The vibration box 3302 is connected to the loading box 3310 inside through the second damping springs 3303. Two second vibration motors 3304 are installed on the outside of the loading box 3310, and the multiple rolling balls 3311 are installed at the bottom of the loading box 3310, the purpose of this structure is that the second vibration motors 3304 are responsible for driving the loading box 3310 to vibrate, the second damping springs 3303 are used to reset the loading box after vibration, and to limit the vibration range, while the rolling balls 3311 are used to bear the weight of the entire loading box 3310, and to ensure that the loading box 3310 can slide left and right and front and back. The right bottom of the loading box 3310 is equipped with the first mounting frame 3312. The first mounting frame 3312 is equipped with two first push rod motors 3313, which are universal parts, and their function is to push out the screw rod to make the second mounting frame 3314 installed on the screw rod move up and down. The second mounting frame 3314 is equipped with two second push rod motors 3315. The second push rod motor 3315 is the universal part, and its function is to control the extension and retraction of the screw rod to control the moving baffle 3316 installed on the screw rod to open and close the loading box 3310. The left bottom of the loading box 3310 is equipped with the same opening as the opening in the right bottom, and the opening is equipped with two third push rod motors 3317 on its outside. The third push rod motor 3317 is an universal part, and its function is to push the moving push plate 3318 installed on the screw rod through the screw rod, thereby pushing the shaped wooden formwork inside the loading box 3310 out through the right bottom opening.

The discharging unit 3400 includes the hollow discharging body 3401 as the main body. The hollow discharging body 3401 defines three oblique inlets 3402 on the left side, and the heights of the oblique inlets are just slightly lower than the three conveying units 2200 of the feeding part 2000, respectively. The middle channel of the hollow discharging body 3401 is slightly smaller than the loading box 3310. The purpose of this structure is that when the conveying unit 2200 sends the wood materials to the upper right corner, they are successively poured into the oblique inlet 3402 under the push of the one-way open transport plate 2203, and then enter the loading box 3310 through the hollow discharging body 3401.

The gauze unit 3500 includes a push rod motor mounting plate 3105, a fourth push rod motor 3501, a fourth push rod 3502, a gripper mounting plate 3503, four electric gripper 3504, and a gauze storage box 3505 which are arranged from top to bottom in that order. The fourth push rod motor 3501 can move the gripper mounting plate 3503 up and down through the fourth push rod 3502. When the gripper mounting plate 3503 moves to above the gauze storage box 3505, the electric grippers 3504 are controlled to grip the gauze and rise. When the moving unit 3300 moves directly below the gauze part 3500, the fourth push rod motor 3501 is controlled to lower the electric grippers 3504, and when the electric grippers 3504 reach an appropriate height, the electric grippers 3504 are released, allowing the gauze to be placed into the loading box 3310.

The glue brushing unit 3600 includes a push rod motor mounting plate 3105, a fifth push rod motor 3601, a fifth push rod 3602, a glue brush mounting plate 3603, a second stepping motor 3604, a rotatable glue brush 3605, and a glass glue storage box 3606 which are arranged from top to bottom. The fifth push rod motor 3601 can move the glue brush mounting plate 3603 up and down through the fifth push rod 3602. When the glue brush mounting plate 3603 moves above the glass glue storage box 3606, the rotatable glue brush 3605 on the second stepping motor 3604 rotates to dip the glass glue by controlling the second stepping motor 3604 on the glue brush mounting plate 3603 to operate. Then, the fifth push rod motor 3601 is controlled to rise the rotatable glue brush 3605, when the moving unit 3300 moves directly below the glue brushing unit 3600, the fifth push rod motor 3601 is controlled to lower the rotatable glue brush 3605. When the rotatable glue brush 3605 reaches an appropriate height, the rotatable glue brush 3605 rotates to brush the inside of the loading box 3310 with glue by controlling the second stepping motor 3604 to operate.

Figure 20:
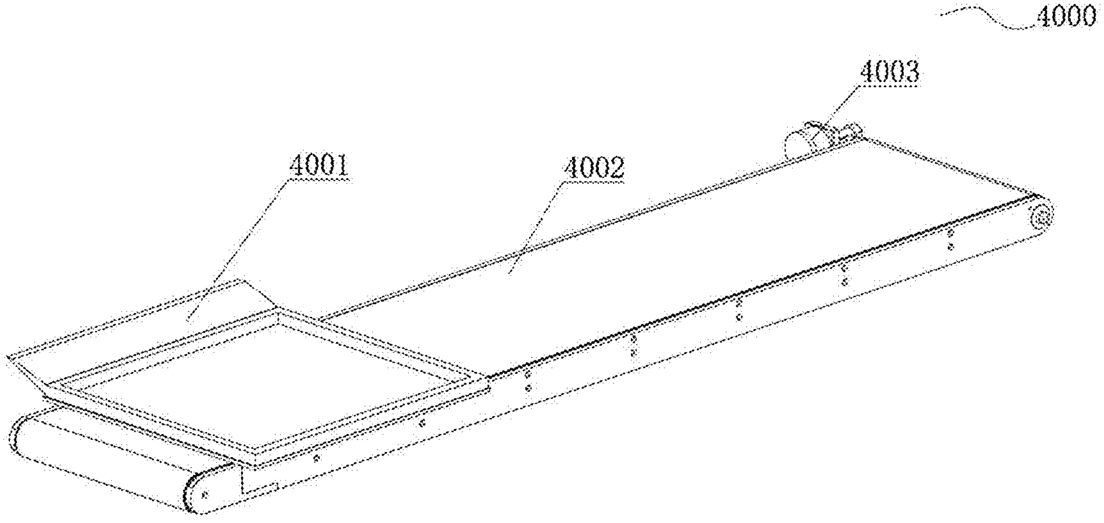
FIG. 20 illustrates a schematic structural diagram of a transporting part.
Figure 21:
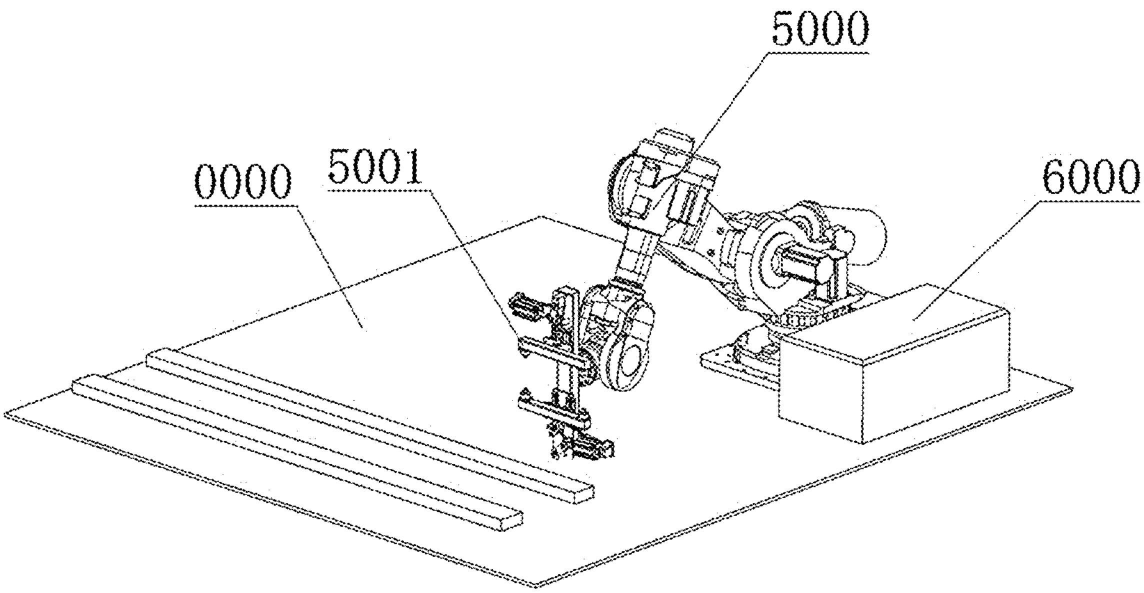
FIG. 21 illustrates a schematic diagram of a mechanical gripper part and a cutting part installed on the platform part.

As shown in FIGS. 20 and 21, the transporting part 4000 includes a second conveyer belt 4002, a second conveying motor 4003, and an inclined transport plate 4001. The left side of the inclined transport plate 4001 is slightly lower than the rectangular opening 3302*a* at the right bottom of the vibration box 3302. The purpose of this structure is that when the compacted wooden formwork is pushed out from the rectangular opening 3302*a*, it can slide into the inclined transport plate 4001 through the inclined angle, and then be transported to the right end by the second conveying motor 4003. Then, the mechanical gripper 5001 of the mechanical gripper part 5000 grips the shaped wooden formwork and takes it to the cutting part 6000 for cutting and reuse. The mechanical gripper part 5000 is a universal part, and its function is to grip the wooden formwork or the waste wooden formwork collection box, and can be replaced by any mechanical device with a gripping function. The purpose of setting the mechanical gripper part 5000 is that when the wooden formwork is screened, the wood materials are added to the wood board screening box 1201, and the mechanical gripper part 5000 directly grips the larger wood boards and places them in the top layer of the feeding part 2000, which not only realizes the feeding function but also ensures that the smaller wood materials can reach the bottom of the screening box during the vibration, thus entering the next screening mechanism. The cutting part 6000 is a wooden formwork cutting machine with a model of MJ276, which functions to cut the shaped wooden formwork into the required shape through the saw blades. When the wooden formwork is cut into scattered waste wooden formwork, it can be collected in a box and then poured into the screening part through the mechanical gripper part 5000, realizing a recycling and reusing process.

Accordingly, the disclosure also provides an intelligent waste wooden formwork recovery and recycling method, including the following steps.

S1, the collected waste wooden formwork is poured into the wood board unit 1200 of the screening part 1000 by a crane or the mechanical gripper part 5000, and the first vibration motor 1203 is started for vibration. The large wood boards remain in the wood board unit 1200, the medium wood strips fall into the wood strip unit 1300, and the small wood blocks fall into the wood block unit 1400. When the large wood board is stuck, it can be gripped by the mechanical gripper 5001 and placed on the top conveying unit 2200 on the right side. After the screening is finished and all wood materials are stable, the wood boards in the top wood board unit 1200 are gripped into the one-way open transport plate 2203 on the left side of the conveying unit 2200 by the mechanical gripper 5001, the wood strips in the middle wood strip unit 1300 are slid into the one-way open transport plate 2203 on the middle conveying unit 2200 by controlling the switch mechanism 1305 to expose the opening, due to the slope at the bottom of the wood strip unit 1300, and the wood blocks in the bottom wood block unit 1400 are also slid into the one-way open transport plate 2203 on the bottom conveying unit 2200 by controlling the switch mechanism 1305 to expose the opening, due to the slope at the bottom of the wood block unit 1400. The wood materials are screened and sent into the feeding part 2000 by the screening part 1000. This structural design effectively screens the existing wood materials, preparing for subsequent separate processing.

S2, the moving unit 3300 of the processing part 3000 is moved below the glue brushing unit 3600, and the rotatable glue brush 3605 is moved into the loading box 3310 by the fifth push rod motor 3601, and the second stepping motor 3604 is controlled to rotate the rotatable glue brush 3605, thereby brushing glue on the inside of the loading box 3310. After the glue is brushed, the glue brushing unit 3600 is raised, the moving unit 3300 is moved below the gauze unit 3500, and the electric grippers 3504 are controlled to extend into the loading box 3310 by the fourth push rod motor 3501, and the electric grippers 3504 are released, allowing the gauze gripped by the electric grippers 3504 to be laid into the loading box 3310, then the gauze unit 3500 is raised; and finally, the moving unit 3300 is moved directly below the discharging unit 3400, and the opening of the loading box 3310 completely covers the opening of the hollow discharging body 3401, completing the pre-feeding work.

S3, the top, middle and bottom first conveying motors 2202 of the feeding part 2000 are controlled respectively, first the one-way open transport plate 2203 at the top is moved to the far right, that is, the large wood boards are added to the discharging unit 3400, then the wood strips in the middle are transported to the discharging unit 3400. At this time, the wood materials enter the loading box 3310 through the discharging unit 3400, the second vibration motors 3304 are started, and with the assistance of the second damping springs 3303 and the rolling balls 3311, the wood boards in the loading box vibrate fully, and the wood strips fall into the gaps of the wood boards and are glued and no longer vibrate. After all the wood strips are glued and fixed, the second vibration motors 3304 are turned off, the moving unit 3300 is moved to the glue brushing unit 3600 for brushing glue, and finally, the moving unit 3300 is returned to the bottom of the discharging unit 3400, the lower wood blocks and sawdust are poured into the discharging unit 3400, the second vibration motors 3304 are turned on, the wood blocks fill the gaps between the wood boards and the wood strips, and after stabilization, the second vibration motors 3304 are turned off, the moving unit 3300 is moved to the glue brushing unit 3600 for brushing glue, then moved to the gauze unit 3500 below to add gauze, and finally moved to the leftmost compaction unit 3200, and the press-fitted plate 3202 enters the loading box 3310 for compaction. At this point, the wooden formwork is re-compacted and shaped. This structure, in conjunction with the three-layer conveying mechanism of the feeding part 2000, has a working sequence of: brushing glue, adding gauze, adding large wood materials, vibration, adding medium wood materials, vibration, adding small wood materials, vibration, brushing glue, adding gauze, compaction, and removal, which assigns the entire wood board compaction and shaping process in a step-by-step manner, making the wooden formwork recycling process more standardized and ensuring that the shaped wooden formwork meets the usage standards.

S4, the moving unit 3300 is moved to the far right, first the second push rod motor 3315 is controlled to retract the moving baffle 3316, so that the opening is exposed at the right bottom of the loading box 3310, and the size of the opening is slightly larger than the shaped wooden formwork. Then, the first push rod motor 3313 is controlled to retract the second mounting frame 3314, the moving baffle 3316 no longer blocks the pushing-out channel of the wooden formwork. At this time, by controlling the third push rod motor 3317 to push the movable push plate 3318, the movable push plate 3318 further pushes the shaped wooden formwork inside the loading box out through the right opening, and after sliding out, the shaped wooden formwork enters the inclined transport plate 4001 of the transporting part 4000 through the rectangular opening 3302*a* of the vibration box 3302. Then, the second conveying motor is controlled to operate the second conveyer belt 4002 to transport the shaped wooden formwork to the vicinity of the cutting part 6000, and the mechanical gripper 5001 is used to grip the shaped wooden formwork into the cutting part 6000 for cutting and reuse with a table saw. This structure pushes out the compacted and shaped wooden formwork, allowing it to enter the transporting part 4000, and the loading box 3310 is emptied to proceed to the next working cycle. Compared with the related art of grabbing the wooden formwork from the top, the technical advantage of this structure is that it does not need to lift the wooden formwork. By using a controllable opening structure at the bottom and pushing the wooden formwork out with push rods, it effectively improves the efficiency of taking out the wooden formwork. At the same time, it does not require a wooden formwork lifting mechanism, saving space and energy. It should be noted that the depth of the inclined transport plate 4001 can be changed to store a variety of shaped wooden formwork.

The above is only the concrete implementation of the disclosure, but the protection scope of the disclosure is not limited to this. Those skilled in the art can understand the transformation or substitution within the technical scope disclosed by the disclosure, and it should be included in the scope of the disclosure.

What is claimed is:

1. An intelligent waste wooden formwork recovery and recycling method, comprising the following steps:

pouring collected waste wooden formwork into a wood board unit of a screening part, and starting a first vibration motor for vibration to make large-sized wood boards remain in the wood board unit, medium-sized wood strips fall into a wood strip unit, and small-sized wood blocks fall into a wood block unit; after screening is completed and all wood materials are stable, gripping the large-sized wood boards in the wood board unit at top by a mechanical gripper into a one-way open transport plate of a top conveying unit, making the medium-sized wood strips in the wood strip unit at middle be slid out into a one-way open transport plate of a middle conveying unit through a bottom opening by controlling a switch mechanism to expose the bottom opening, and making the small-sized wood blocks in the wood block unit at bottom be slid out into a one-way open transport plate of a bottom conveying unit through a bottom opening by controlling a switch mechanism to expose the bottom opening, thereby completing the screening of the wood materials and transporting the wood materials from the screening part to a feeding part;

controlling a moving unit of a processing part to move below a glue brushing unit; moving, driven by a fifth push rod motor, a rotatable glue brush inside a loading box; rotating, driven by a second stepping motor, the rotatable glue brush to brush glue on an inside of the loading box; raising the glue brushing unit after the glue is brushed; controlling the moving unit to move below a gauze unit; controlling, by a fourth push rod motor, an electric gripper to extend into the loading box; releasing the electric gripper to make gauze gripped by the electric gripper be laid into the loading box, and then raising the gauze unit; and controlling the moving unit to move directly below a discharging unit, making an opening of the loading box completely cover an opening of a hollow discharging body, thereby completing pre-feeding work;

controlling top, medium and bottom first conveying motors of the feeding part separately; adding the large-sized wood boards to the discharging unit, followed by transporting the medium-sized wood strips to the discharging unit, and making the large-sized wood boards and the medium-sized wood strips enter the loading box through the discharging unit; starting a second vibration motor to vibrate the large-sized wood boards and the medium-sized wood strips inside the loading box thoroughly through second damping springs and rolling balls, with the medium-sized wood strips falling into gaps between the large-sized wood boards and being glued to stop vibrating; turning off the second vibration motor after the medium-sized wood strips are fixed with the glue, moving the moving unit to the glue brushing unit to brush glue, then returning the moving unit to the discharging unit below, and pouring the small-sized wood blocks in the wood block unit into the discharging unit; turning on the second vibration motor to make the small-sized wood blocks fill gaps between the large-sized wood boards and the medium-sized wood strips, and turning off the second vibration motor after stabilization; moving the moving unit to the glue brushing unit to brush glue, then moving the moving unit to the gauze unit below to add gauze; and moving the moving unit to a compaction unit to compact the wood materials in the loading unit by making a press-fitted plate enter the loading box, thereby re-compacting and shaping wooden formwork; and moving the moving unit to a far right end, controlling a second push rod motor to retract a moving baffle to expose an opening at a bottom of the loading box, and a size of the opening being larger than the shaped wooden formwork; controlling a first push rod motor to retract a second mounting frame to make the moving baffle no longer block a wooden formwork pushing-out channel; and controlling a third push rod motor to push a moving push plate, thereby pushing, by the moving push plate, the shaped wooden formwork in the loading box to slide out through the opening to enter an inclined transport plate of a transporting part through a rectangular opening of the vibration box, then transporting the shaped wooden formwork to a vicinity of a cutting part by controlling a second conveyer belt with a second conveying motor, and gripping the shaped wooden formwork by the mechanical gripper into the cutting part to cut and reuse with a table saw.

2. An intelligent waste wooden formwork recovery and recycling system, comprising: a platform part, wherein the platform part is provided with a screening part, a feeding part, and a processing part thereon; the screening part comprises: a frame unit, and a wood board unit, a wood strip unit, and a wood block unit which are arranged inside the frame unit from top to bottom in that order;

wherein the feeding part comprises: an installation unit and three conveying units, the three conveying units are respectively disposed at a top, a middle, and a bottom of the installation unit, and the three conveying units are inclined and arranged within the installation unit; and inclined downward ends of the three conveying units are respectively connected to the wood board unit, the wood strip unit, and the wood block unit, and the three conveying units are respectively configured to transport wood materials from the wood board unit, the wood strip unit, and the wood block unit; and wherein the processing part comprises: a bracket unit, and a compaction unit, a moving unit, an discharging unit, a gauze unit, and a glue brushing unit which are sequentially disposed on the bracket unit.

3. The intelligent waste wooden formwork recovery and recycling system as claimed in claim 2, wherein the wood board unit comprises: a wood board screening box as a main body, a top of the wood board screening box defines an opening, and a bottom of the wood board screening box defines a plurality of evenly spaced holes; a front and a back of the wood board screening box are respectively provided with two first longitudinal top struts, which are respectively connected to irregular shock absorbers on first transverse steel frames at a front and a back of the frame unit; a left and a right of the wood board screening box are respectively provided with two groups of a first transverse top strut and a first transverse bottom strut, which are connected to irregular shock absorbers in middles of first and second longitudinal steel frames on a left and a right of the frame unit; and two first vibration motors are respectively disposed on middles on the left and the right of the wood board screening box.

4. The intelligent waste wooden formwork recovery and recycling system as claimed in claim 2, wherein the wood strip unit comprises: a wood strip screening box as a main body, a top of the wood strip screening box defines an opening that is larger than that of the wood board screening box, and a bottom of the wood strip screening box defines a plurality of holes; a front and a back of the wood strip screening box are respectively provided with two groups of second longitudinal top struts, which are respectively connected to irregular shock absorbers in middles of second transverse steel frames at a front and a back of the frame unit; a left bottom and a right bottom of the wood strip screening box are respectively provided with second transverse bottom struts, which are respectively connected to irregular shock absorbers on insides of third longitudinal steel frames at a left and a right of the frame unit; first vibration motors are respectively disposed at lower middles of the left and the right of the wood strip screening box; and the bottom of the wood board screening box is provided with a slope, and a bottom of the slope defines an opening, and a discharging baffle is disposed outside the opening.

5. The intelligent waste wooden formwork recovery and recycling system as claimed in claim 2, wherein the wood block unit comprises: a wood block conveying box, a top of the wood block conveying box defines an opening that is larger than the wood strip screening box; and a bottom of the wood block conveying box is provided with a slope, a bottom of the slope defines an opening, and a discharging baffle is disposed outside the opening.

6. The intelligent waste wooden formwork recovery and recycling system as claimed in claim 4, wherein a side of the discharging baffle is provided with a rack track, and two sides of the rack track are provided with rack baffles, respectively; a first stepping motor is located on a side of the wood strip screening box, adjacent to the rack track; and the first stepping motor meshes with the rack track through a first gear.

7. The intelligent waste wooden formwork recovery and recycling system as claimed in claim 2, wherein the compaction unit comprises: a servo compressor as a main body, and a press-fitted plate disposed on a top of the servo compressor, a size of the press-fitted plate is the same as an opening of a loading box; and the press-fitted plate is configured to enter the loading box and compact wood materials inside; and wherein the moving unit comprises: a vibration box as a main body, the vibration box is installed on H-shaped steel beams through electric trolleys disposed below the vibration box; the vibration box is connected to the loading box inside through second damping springs; an outside of the loading box is provided with two second vibration motors, and a bottom of the loading box is provided with a plurality of rolling balls; a bottom of the loading box is provided with a first mounting frame; the first mounting frame is provided with two first push rod motors which are configured to make a second mounting frame installed on the first push rod motors to move up and down; and the second mounting frame is provided two second push rod motors thereon, which are configured to control a moving baffle mounted on a screw rod to close and open the loading box.

8. The intelligent waste wooden formwork recovery and recycling system as claimed in claim 2, wherein the discharging unit comprises: a hollow discharging body as a main body, the hollow discharging body defines three oblique inlets, heights of the oblique inlets are respectively lower than the three conveying units of the feeding part, and a central channel of the hollow discharging body is smaller than a loading box;

wherein the gauze unit comprises: a push rod motor mounting plate, a fourth push rod motor, a fourth push rod, a gripper mounting plate, four electric grippers, and a gauze storage box which are arranged from top to bottom in that order, and the fourth push rod motor is configured to move the gripper mounting plate up and down through the fourth push rod; and wherein the glue brushing unit comprises: a push rod motor mounting plate, a fifth push rod motor, a fifth push rod, a glue brush mounting plate, a second stepping motor, a rotatable glue brush, and a glass glue storage box which are arranged from top to bottom in that order, and the fifth push rod motor is configured to move the glue brush mounting plate up and down through the fifth push rod.

9. The intelligent waste wooden formwork recovery and recycling system as claimed in claim 2, further comprising: a transporting part disposed on the platform part; wherein the transporting part comprises: a second conveyer belt, a second conveying motor located on a side of the second conveyer belt, and an inclined transport plate located at an upper end of the second conveyer belt; and an inclined height of a side of the inclined transport plate is lower than a rectangular opening on a side of a vibration box.

10. The intelligent waste wooden formwork recovery and recycling system as claimed in claim 2, further comprising: a mechanical gripper part disposed on the platform part; wherein the mechanical gripper part comprises: a mechanical gripper, configured to grip wood boards and place the gripped wood boards onto the conveying unit disposed at the top of the installation unit, or to grip shaped wooden formwork and move the shaped wooden formwork to a cutting part for cutting.

* * * * *